Jan. 1, 1929.
L. B. SPERRY
1,697,293
SEXTANT
Original Filed Sept. 28, 1923
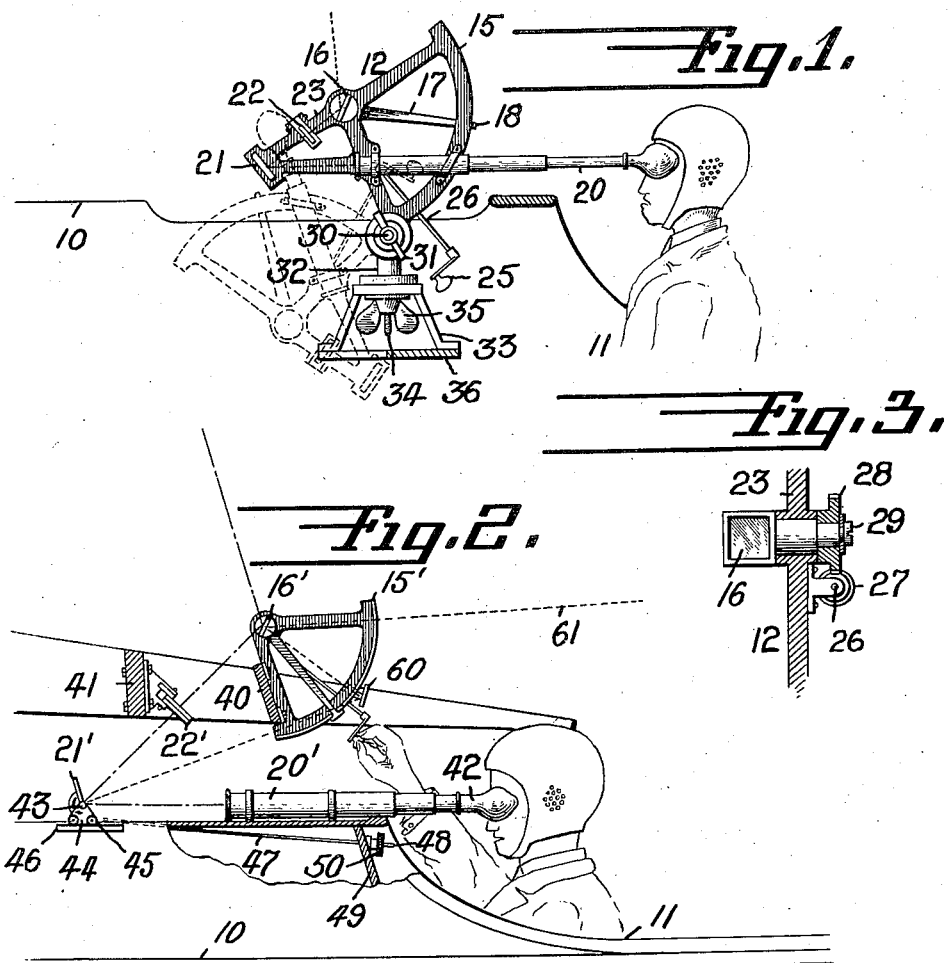
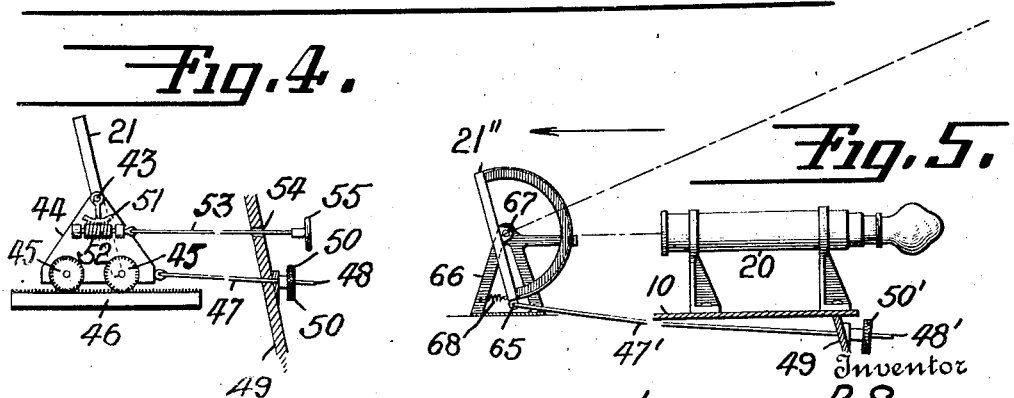
Inventor
Lawrence B Sperry
By his Attorney
Herbert H. Thompson Patented Jan. 1, 1929.

1,697,293

UNITED STATES PATENT OFFICE.

LAWRENCE B. SPERRY, OF FARMINGDALE, NEW YORK; THE BANK OF AMERICA, OF NEW YORK, N. Y., AND WINEFRED ALLEN SPERRY, OF HEMPSTEAD, NEW YORK, EXECUTORS OF SAID LAWRENCE B. SPERRY, DECEASED, ASSIGNORS TO THE PIONEER INSTRUMENT COMPANY, INC., OF BROOKLYN, NEW YORK, A CORPORATION OF NEW YORK.

SEXTANT.

Application filed September 28, 1923, Serial No. 665,492. Renewed May 22, 1928.

This invention relates to sextants or angle measuring means, particularly when such instruments are adapted to be utilized upon a moving vehicle, such as for example, an aircraft. As is well known, the present type of sextant must be held in the operator's hand and a sight taken on the horizon, and by reflecting surfaces, on the body, usually the sun, whose angle of elevation is to be determined. It is essential therefore, that the sextant be held steadily in the hand and adjusted on the horizon and sun until the smallest angle is found to exist between the two. Due to the enormous vibrating slip stream from the propeller, it is impossible to hold such an instrument steady in the hand. It is the principal object of my invention therefore, to provide means whereby the sextant may be firmly mounted, without exposure to excessive vibration, but capable of ready adjustment and manipulation for sighting purposes. I accomplish this by mounting the sextant movably and adjustably upon the body of the aircraft proper, since as is well known, the aircraft is very steady as compared to the hand of an operator.

It is a further object of this invention to provide a mounting for a sextant which is freely adjustable to permit proper determination of the angle either between the horizon and the sun, or between various other planetary bodies.

It is a further object of this invention to provide a sextant which will permit an operator to determine the elevation or other angle of a body, regardless of whether said body is positioned at the front, or to the rear of said operator.

Further objects and advantages of this invention more or less broad than those hereinbefore set forth, will be in part obvious and in part specifically referred to in the specification.

In the accompanying drawings:

Fig. 1 is a side view, partly sectioned, through an aircraft, showing a sextant embodying one form of my invention applied thereto and disclosing the relative positioning of said instrument with respect to the operator.

Fig. 2 is a modified form of my invention showing means whereby the instrument is effective with respect to an object at the front or to the rear of the operator.

Fig. 3 is a detail of a mirror adjusting mechanism.

Fig. 4 is a detail of an adjusting mechanism for the combined mirror and window.

Fig. 5 is still another modified form of my invention which is adapted to be employed with respect to an object positioned always to the rear of the operator.

Referring to Fig. 1 there is shown an aircraft body 10 having a cock-pit 11 in which an aviator or other operator is seated. Mounted forwardly of said operator is a sextant, indicated generally at 12. In this form of the invention, the sextant resembles very closely the ordinary type of sextant, comprising a sector 15, a reflecting surface or mirror 16 pivotally mounted at the center of said sector and adapted to be operated by an index hand 17, having an index 18 cooperating with the periphery of the sector, which is provided with suitable angular graduations. The index hand 17 may be provided also with the usual vernier cooperating with the scale on the sector. The sextant further comprises a telescope 20, and a combined mirror and window 21, the mirrored portion of said member 21 being adapted to reflect the rays of light transmitted by the mirror 16 and the window portion of member 21 permitting sighting of the horizon through said telescope. A ground glass plate 22 may be interposed in the path of the rays of light reflected from mirror 16 to member 21 and mounted preferably upon an extension 23 of the center member.

The operation of the sextant is of course well known and need not be further described here. Ordinarily, the sextant hereinbefore described would be held in the hand of the operator while he sighted the horizon through member 21 and attempted to hold said sextant steady until the line of sight to the horizon was brought into coincidence with the dividing line between the reflector portion and transparent portion of member 21. Thereafter, the mirror 16 would be operated as by a handle 25 at the end of a stem 26 having a worm 27 at its other end meshing with a pinion 28 fixed to the shaft 29 which carries the mirror 16, until the ray of light from the body sighted at is also brought to said dividing line on the member 21. It is obvious that it would be practically impossible for an operator to hold the sextant in his hand and maintain the lines of sight as hereinbefore described steadily upon said dividing line, since the instrument is obviously in the slip stream of the propeller and said stream is of a powerful vibratory character. I therefore mount the sextant upon the body of the aircraft proper, since as hereinbefore stated, the vibration of the aircraft is relatively slight as compared to the vibration in the path of the slip stream.

In Fig. 1 I have shown one mounting in which I mount the sextant as a whole about a pivot 30, locking the sextant in position by means, such as a thumb nut 31, or other suitable locking device. The pivotal axis 30, is horizontal and is at the upper end of a shaft 32 extending through a base bracket 33, in which it is pivoted for movement about a vertical axis. The shaft 32 is provided with a reduced shank portion 34, preferably threaded, and adapted to be engaged by a locking means, such as a thumb nut 35, whereby the entire sextant may be rotated about a vertical axis and locked in any desired position. Bracket 33 is fixed to a base 36 fixedly attached to the interior of the aircraft. When not in use, the entire sextant may be swung bodily about axis 30 to the interior of the aircraft body, out of the path of the slip stream. The pivotal mounting of the sextant as described, permits sighting of the angle, not only between the horizon and a body, such as the sun, but also between any two bodies, as for instance, between two stars.

In Fig. 2 I have shown a modified form of my invention, wherein instead of employing the ordinary type of sextant, I separate the members comprising the sextant, and am thus enabled to position them in a more suitable manner upon the aircraft. As shown, sector 15' is fixed to a bracket 40 mounted on the aircraft body, while the member 21', having the combined mirror and window, is separated from the sector to permit its positioning at any desired distance therefrom. The ground glass member 22' is also separated from the sector and is fixed to a bracket 41 on the aircraft. The telescope 20' is detached from the sector and fixed to the body of the aircraft so that eye piece 42 extends into the cock-pit adjacent the eye of the operator. To permit suitable positioning of the member 21', relative to the sector, I mount said member 21' pivotally about an axis 43 in a member 44 supported upon pinions 45 in engagement with a rack 46. To said member 44 I fix a link 47, the other end of which is threaded as at 48 and extends through the dashboard 49 in the cock-pit. Mounted upon said threaded end 48 is a nut 50 which is adapted to draw upon said link 47 to move said bracket 44 and hence member 21', nearer to, or further from the telescope and sector. In Fig. 4 I have shown additional means for enabling the operator to vary the inclination of said member 21' from a distance, I fix to the shaft 43, upon which the member 21' is supported in Fig. 2, a sector 51 having teeth which mesh with a worm 52 at the end of a stem 53 extending loosely through an opening 54 in the dashboard 49 and having a knob 55 at its inner end, so that by rotation of said knob, inclination of member 21 may be varied. The stem 53 operates loosely in opening 54, so that it does not interfere with the linear movement of bracket 44 during the adjustment by nut 50. It is apparent that by this arrangement, far greater flexibility of operation is possible and readings may be taken, without requiring the usual fineness of operation of the parts of the instrument.

The device as shown in Fig. 2 may be employed, irrespective of whether the object whose angle is to be determined is to the front or to the rear of the operator. When said object is to the front of the operator, the device will function in the usual manner, the ray of light being reflected by mirror 16' to the member 21' and thence to the telescope. When the object is to the rear of the operator, I provide the following arrangement, whereby the same result may be obtained. I employ a double mirror 16', having both its faces reflecting surfaces, and provide an additional mirror 60, fixed to the sector 15' in such position that a ray of light 61 coming from the rear and striking the reflector 16' will be reflected to mirror 60 and thence to member 21.

Where it is not desired to provide the extra mirror 60, the object whose angle is to be determined must always be positioned in front of the operator before a reading can be taken, so that if the object happens to be to the rear of the operator, it is necessary to turn the aircraft half way around to bring said object to the front of the operator.

In Fig. 5 I have shown still another modification of my invention, whereby the object whose angle is to be determined must be positioned always to the rear of the operator before a sight can be taken, so that if the object happens to be to the front of the operator, it is necessary to turn the aircraft part way around. In this modification, I am able to dispose of the mirror 16, 16' of the former device and employ merely a member 21", similar to member 21 and 21', whose inclination may be adjusted by means of a link 47', having a threaded end 48' extending through dashboard 49 and having a lock-nut 50' cooperating with said threaded end to draw the link forwardly or rearwardly. The outer end of said link is pivotally connected to the member 21″ at 65, said member being mounted in a bracket 66 for movement about an axis 67, and said link operating against the action of a restoring spring 68 fixed to sector 21″ and bracket 66.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention, what I claim and desire to secure by Letters Patent is:

1. In combination, an aircraft, a sextant comprising a sector having a reflector mounted thereon, a telescope, and a combined reflector and transparent member, all of said parts being mounted on said aircraft, and means connecting said aircraft and said sextant for adjusting said member from a distance relative to said reflector.

2. In combination, an aircraft, a sextant comprising a sector having a reflector mounted thereon, a telescope, and a combined reflector and transparent member, all of said parts being mounted on said aircraft, and means connecting said aircraft and said sextant for adjusting the angle of inclination of said member from a distance.

3. In combination, an aircraft, a sextant comprising a sector having a reflector mounted thereon, a telescope, and a combined reflector and transparent member, all of said parts being mounted on said aircraft, means connecting said aircraft and said sextant for adjusting said member from a distance relative to said reflector and means connecting said aircraft and said sextant for adjusting the angle of inclination of said member from a distance.

In testimony whereof I have affixed my signature.

LAWRENCE B. SPERRY.